(12) United States Patent
Henderson

(10) Patent No.: US 10,266,225 B2
(45) Date of Patent: Apr. 23, 2019

(54) BICYCLE HANDLEBAR AND CONTROL SYSTEM

(71) Applicant: Neal Henderson, Escondido, CA (US)

(72) Inventor: Neal Henderson, Escondido, CA (US)

( * ) Notice: Subject to any disclaimer, the term of this patent is extended or adjusted under 35 U.S.C. 154(b) by 0 days.

(21) Appl. No.: 14/667,005

(22) Filed: Mar. 24, 2015

(65) Prior Publication Data
US 2015/0296907 A1 Oct. 22, 2015

Related U.S. Application Data

(60) Provisional application No. 61/981,984, filed on Apr. 21, 2014.

(51) Int. Cl.
| | | |
|---|---|---|
| *B62K 21/12* | (2006.01) | |
| *B62K 21/16* | (2006.01) | |
| *B62L 3/00* | (2006.01) | |
| *B62M 25/04* | (2006.01) | |
| *A41D 19/00* | (2006.01) | |
| *A41D 27/10* | (2006.01) | |
| *B62K 23/02* | (2006.01) | |
| *B62M 25/08* | (2006.01) | |

(52) U.S. Cl.
CPC ............. *B62K 21/16* (2013.01); *A41D 27/10* (2013.01); *B62K 21/12* (2013.01); *B62K 23/02* (2013.01); *B62L 3/00* (2013.01); *B62M 25/08* (2013.01); *A41D 19/0024* (2013.01); *A41D 2600/104* (2013.01)

(58) Field of Classification Search
CPC ................ A41D 27/10; A41D 19/0024; A41D 2600/104; B62K 21/16; B62K 23/02; B62K 21/14; B62K 21/12; B62L 3/00; B62M 25/08; A63B 2022/0082
See application file for complete search history.

(56) References Cited

U.S. PATENT DOCUMENTS

| | | | | |
|---|---|---|---|---|
| 4,023,436 A | * | 5/1977 | Dodge ................ | B62K 21/16 74/551.3 |
| 4,384,497 A | * | 5/1983 | Gatsos ................ | B62K 21/16 74/531 |
| 5,211,075 A | * | 5/1993 | Martin-Rossman ..... | B62J 11/00 446/227 |
| 5,555,775 A | * | 9/1996 | D'Aluisio ............ | B62K 21/16 74/551.3 |
| 5,728,017 A | | 3/1998 | Bellio et al. | |

(Continued)

FOREIGN PATENT DOCUMENTS

| | | | | |
|---|---|---|---|---|
| DE | 4336485 A1 | * | 6/1994 | ........... B62K 21/125 |
| DE | 10155889 A1 | * | 11/2003 | ............. B62K 15/00 |

(Continued)

*Primary Examiner* — Adam D Rogers
(74) *Attorney, Agent, or Firm* — Mark Wisnosky

(57) ABSTRACT

A bicycle handlebar system is described. The system includes a wing-shaped handlebar for a bicycle that is attached to at least one of the rider's forearms. A sleeve, worn by the rider is included in some embodiments. The system also includes a remote control system incorporated into the rider's glove to control the derailleur and brakes of the bicycle without the need for the rider to move his hands to a new position. Multiple positions of the rider's forearms are possible for varying degrees of aerodynamic performance and control of the bicycle.

8 Claims, 14 Drawing Sheets

(56) References Cited

U.S. PATENT DOCUMENTS

| | | | | |
|---|---|---|---|---|
| 5,737,967 | A * | 4/1998 | Hartley | B62K 21/16 74/551.1 |
| 6,234,042 | B1 * | 5/2001 | An | B62K 21/16 74/551.3 |
| 6,945,136 | B2 * | 9/2005 | Nielsen | B62K 15/008 74/551.5 |
| 7,055,178 | B2 * | 6/2006 | Gottlieb | A41D 19/0034 2/160 |
| 7,077,029 | B2 * | 7/2006 | McColligan | B62K 21/12 74/551.8 |
| 7,176,586 | B2 * | 2/2007 | Ledford | B62K 11/14 307/112 |
| 7,243,573 | B2 | 7/2007 | Bass et al. | |
| 8,230,758 | B1 | 7/2012 | Eddy | |
| 8,307,736 | B2 | 11/2012 | Lin | |
| 8,348,810 | B2 * | 1/2013 | Land | A63B 21/00065 482/47 |
| 9,273,928 | B1 * | 3/2016 | Uhlmann | F41C 27/00 |
| 2009/0211828 | A1 | 8/2009 | Bon | |
| 2012/0272777 | A1 | 11/2012 | Tolhurst | |

FOREIGN PATENT DOCUMENTS

| | | | | |
|---|---|---|---|---|
| DE | 10216888 A1 * | 11/2003 | | B62K 21/125 |
| DE | 202010009227 U1 * | 10/2011 | | B62K 21/16 |
| FR | 568356 A * | 3/1924 | | B62K 21/16 |
| WO | WO 0001572 A1 * | 1/2000 | | B62K 21/16 |

\* cited by examiner

BICYCLE HANDLEBAR AND CONTROL SYSTEM

CROSS-REFERENCE TO RELATED APPLICATIONS

This application claims the benefit of U.S. Provisional Patent Applications 61/981,984, filed Apr. 21, 2014, titled "Bicycle Handlebar and Control System", and by the same inventor.

BACKGROUND OF THE INVENTION

Technical Field

The present invention relates to devices that enable a bicycle to maintain a more nearly ideal aerodynamic configuration as would be particularly beneficial to a rider participating in a bicycle racing event.

Related Background Art

The technologies underpinning bicycle racing have evolved rapidly over the past few decades resulting in new materials and devices for increasing the speed and efficiency of the racing system comprising the machine and its rider. The primary aims of these development activities have been two-fold: 1) reducing the weight of a system element while maintaining minimum structural strength requirements and 2) reducing the aerodynamic drag of the racing system. In spite of these advances, the rider remains the single largest source of inefficiency, typically representing more than 80% of the total aerodynamic drag on the racing system, while the bicycle itself typically represents about 20% of the total drag, with the balance attributed to other mechanisms.

In order to move forward a cyclist must overcome forces due to gravity and aerodynamic drag. On a flat surface aerodynamic drag can account for 70 percent of the resistance felt by a cyclist. Aerodynamic drag is due to friction forces as air flows over the body surface of the rider and bicycle and forces due to the form or cross-section the rider presents to the wind. Skinsuits, teardrop helmets, show covers and shaving a rider's legs are used by riders to overcome the surface frictional forces. Optimization of the rider's position and various aerodynamic devices have been used by riders to overcome drag due to the form of the rider. The drag coefficients are related to the product of a dimensionless coefficient of drag that relates to the shape of an object and that object's frontal area exposed to the moving fluid stream. Thus, to reduce the aerodynamic drag force at a particular vehicle speed, one is led to reduce either or both of the frontal area and the coefficient of drag of the rider and the bicycle. Such has been the motivation behind the development of devices such as aerodynamically shaped frames, handle bars, wheels, brakes, etc. that act primarily to reduce the coefficient of drag of those elements of the bicycle. Similarly, the development of aerodynamically shaped helmets, skin suits, glasses and the like reduce the coefficient of drag of the rider.

Much improvement has been accomplished using these devices, but the nature of athletic competition is that all highly skilled riders train to benchmarks set by recent competitions, and arrive at a new race with remarkably similar physical capabilities. Improvements of less than a percent attributable to their equipment can easily make the difference between winning and losing an important competition. Consequently, there is an ongoing need for innovation in this area.

The present invention comprises an innovation that allows the rider to more easily assume an aerodynamic position, more easily control the bicycle while in that position and a handlebar system that reduces the coefficient of drag.

DISCLOSURE OF THE INVENTION

The present provides for a wing-shaped handlebar system handlebar system for a bicycle. In one embodiment the handlebar system can be folded for shipping. In another embodiment the handlebars comprise a wing that fit over the top of conventional handlebars. In another embodiment the system includes a support that is worn on at least one of the rider's arms and the support attaches to the wing shaped handlebar. In another embodiment the system further includes a remote control for the bicycle brakes and a remote control for shifting of the derailleur of the bicycle. In another embodiment the remote controls are integrated into gloves worn by the rider.

DETAILED DESCRIPTION

Figure 1:
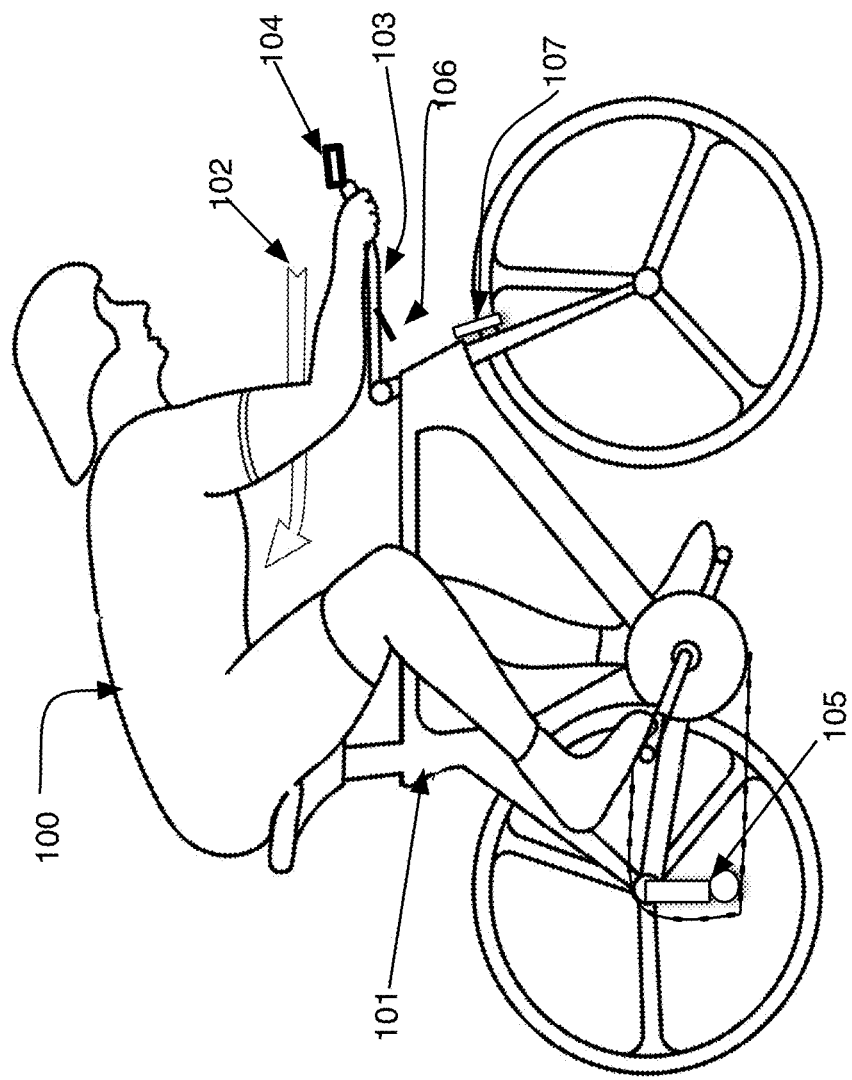
FIG. 1 shows a bicycle rider in a conventional riding position on a bicycle having conventional aerodynamic handlebars.

FIG. 1 depicts the prior art and shows a rider 100 on a bicycle 101 in a conventional racing configuration. A main source of drag is due to wind 102 flowing against the rider's chest. For this reason the rider assumes a bent position and also position their arms in front of them holding onto aero-bars 103. The aerobars include shifter controls 104 for shifting the derailleur 105 and brake levers 106 for controlling the brakes 107. Current technology for controls include cables running within housing that actuates the derailleur 105 or brakes 107. Electronic shifters are also recently available that use a wire running from the derailleur controller 104 and an electronic actuator located on the derailleur 105. Brake actuators are still either mechanical with a cable within a housing to mechanically actuate the brake 107. On some bicycles, notably mountain bikes, hydraulic actuated brakes are available. Note that in order to actuate the brake lever the rider must move their hands from the current aerodynamic position shown to a less aerodynamic position (not shown) to reach the brake lever. This positioning and the required movement are typical of current technology.

Figure 2:
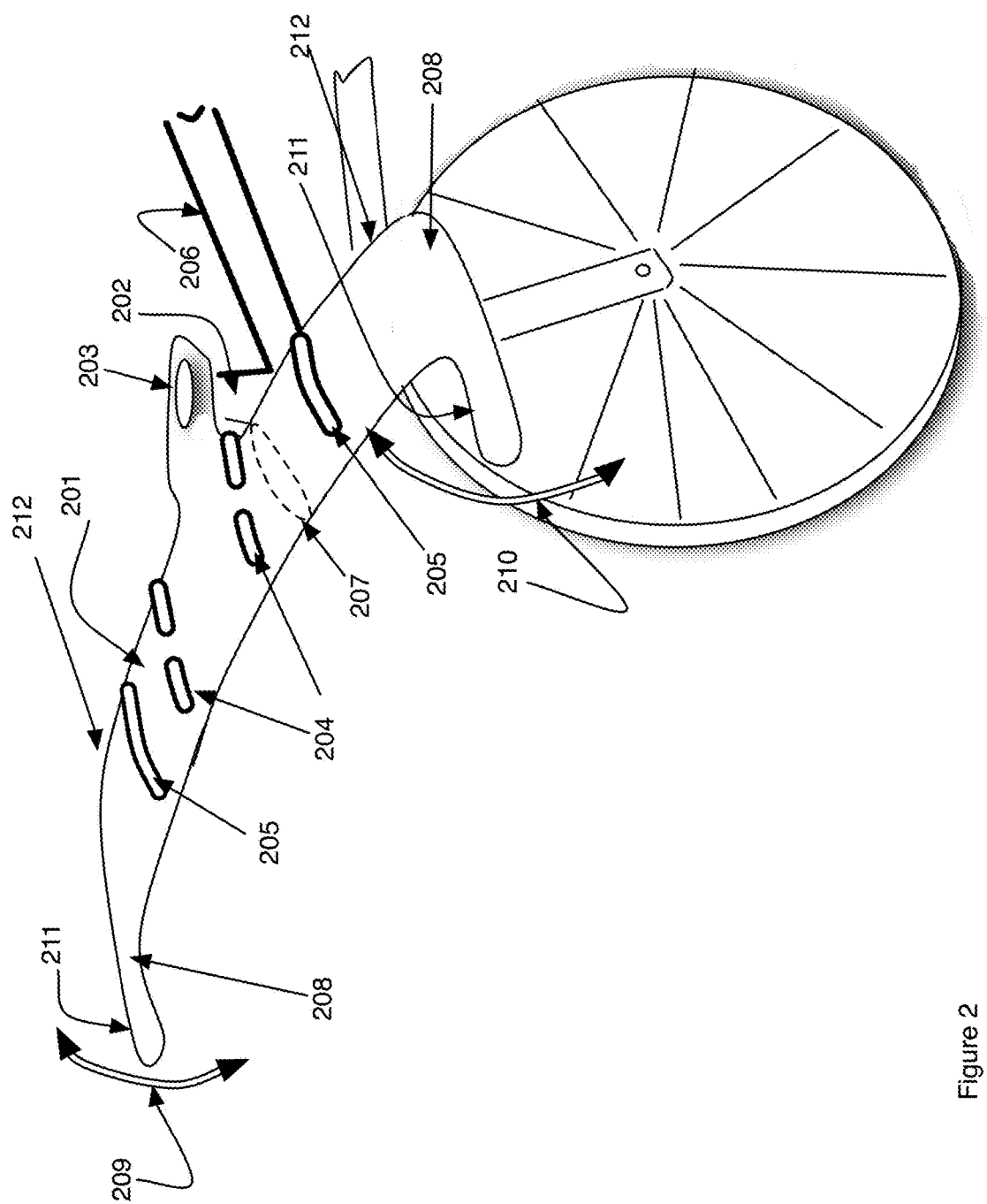
FIG. 2 shows a first embodiment of a wing shaped folding handlebar system.
Figure 4:
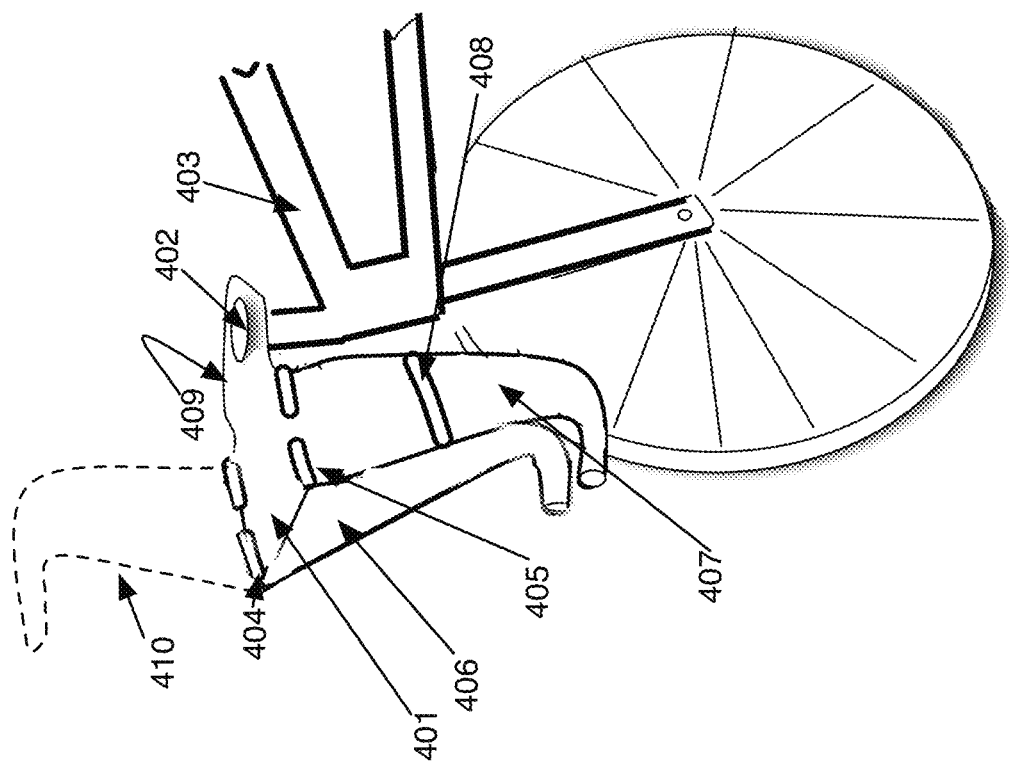
FIG. 4 shows an embodiment of a wing-shaped handlebar system folded down for shipping or storage.

A first embodiment of the present invention is shown in FIG. 2. The invention is comprised of an elongated wing shaped bar that is attached to the stem 202 of a bicycle 206. In this embodiment attachment is by conventional screw attachment to the stem as is known in the art. The wing shaped bar 201 has an elliptical cross-sectional shape 207 and further includes hinges 204 that are located on either side of the attachment point 203. The hinges allow movement of the ends 208 of the handlebar in an up and down direction 209, 210. The needs may be adjusted partially in the up and down for a preferred position of the rider when riding the bicycle or can be folded completely down as is shown in FIG. 4. The wing shaped bar further includes attachment points 205. The attachment points are used to secure the riders forearms to the bar for balance and control when riding. Two attachment points are shown but a plurality of attachment points may be included to allow adjustment of the riders position during the ride. In one embodiment the wing shaped bar further includes projections 211 at either end of the wing for gripping by the rider for improved stability especially while cornering. The projections are shown going in a forward position but in another embodiment the projections are from the rear edge 212 of the wing.

Figure 3A:
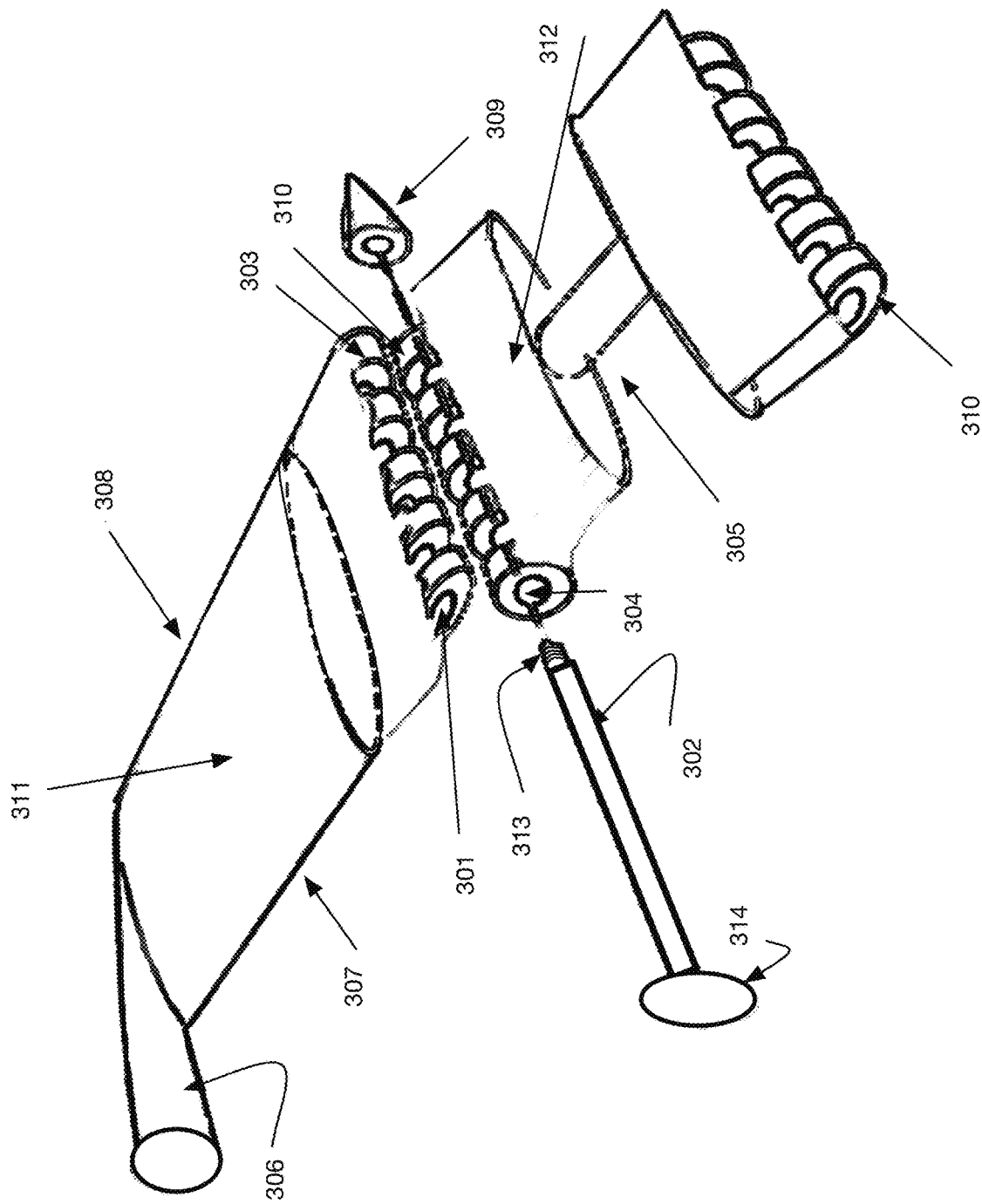
FIG. 3A shows a second embodiment of a wing shaped handlebar system.

In another embodiment shown in FIG. 3A, the wing shaped bar is seen to include a series of fingers 301 that mesh with a series of holes 304 in the mid section of the wing. Note only one arm of the wing is shown in the Figure. The wing section 311 is held to the middle section 312 when the fingers are mated with the rings and secured in place with a pin 302. The pin is threaded at one end 313 and held in place with a nut 309. The bar may be held in various positions of rotation about the hinge by loosening the knob 314 moving the outer wing up or down to the desired position and retightening the knob 314 thereby causing the nut 309 to compress against the fingers 303 and hold the wing in position. In the embodiment shown the wing bar includes a bar 305 in the center section that is an attachment point and may be clamped to the stem of a bicycle. The bar 305 is sized the same as a conventional handlebar and would be clamped in position with a conventional stem the same as handlebars are clamped onto a bicycle as is known in the art. The winged handle bar assembly could then be rotated about the bar 305 for the position most aerodynamically favorable as well as comfortable to the rider. The handlebar assembly is comprised of a platform, having a first edge 307 and a second edge 308 located on the outer perimeter and parallel to each other and perpendicular to the travel direction of the bicycle, a third edge 306 and a fourth edge (not shown in FIG. 3A) located on the outer perimeter and parallel to each other and parallel to the travel direction of the bicycle, and including an attachment point 305 to the bicycle located along the first edge and midway between the third edge and the fourth edge.

Figure 3B:
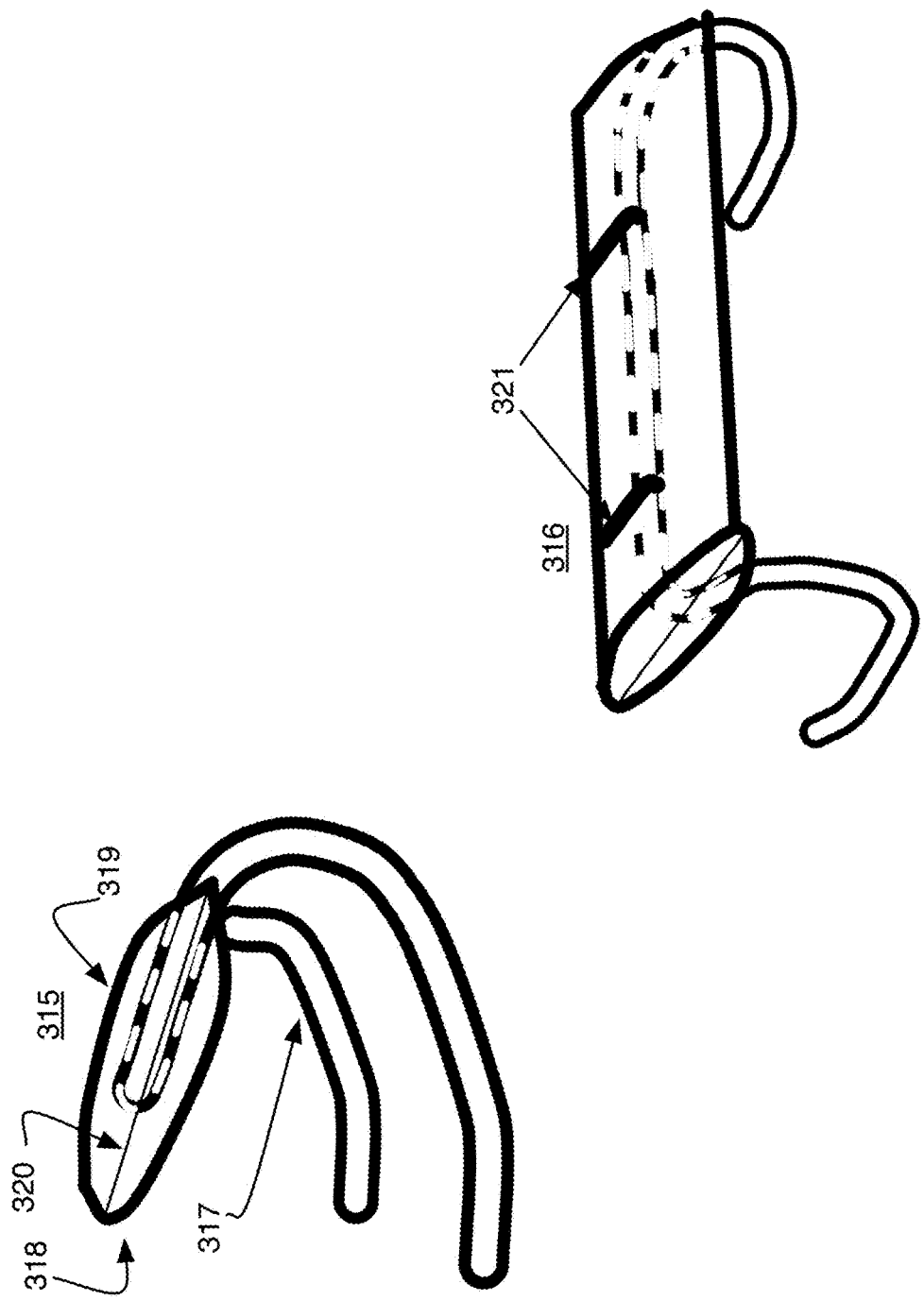
FIG. 3B shows a third, clamshell, embodiment of the wing shaped handlebar system.

In another embodiment, shown in FIG. 3B, a clamshell version of the wing shaped handlebar system is shown. A side view 315 and a perspective front view 316 show that the wing is split longitudinally into a top half 319 and a bottom half 318 forming a seam 320 at which the two halves of the handlebar may be opened and clamped over conventional bicycle handlebars 317 thereby providing a means to retrofit a bicycle with an aerodynamic handlebar system. The clam shells are held together once clamped over the handlebars using tape, screws or hook and latch systems as are known in the art. The rider may use the wing shaped handlebars in the same manner as described herein for other embodiments. The attachment points 321 for the rider's forearms to the wing-shaped handlebars may be the same as any of the other variations for attachment points described herein.

Referring now to FIG. 4, the wing shaped handlebars are shown in the fully lowered position for storage or shipping of the bicycle 403 without the need to remove the handlebars. The handlebars are comprised of a center section 401 that is attached to the headset 402 of the bicycle the stem 409 in this embodiment is integrated into the center portion 401 of the winged handlebar assembly. The wing shaped handlebar includes a pair of hinges 404, 405 located on either side of the center section 401 and used to attach the outer wing sections 406, 407 to the center section 401. The wings 406, 407 may be rotated about the hinges and are shown in a fully lowered position. The wings 406, 407 may be rotated to any position about the hinge extending from the fully lowered position shown in the figure to a completely vertical position as depicted by the arm 410 shown in dotted lines. The wing shaped bar further includes attachment points 408.

Figure 5:
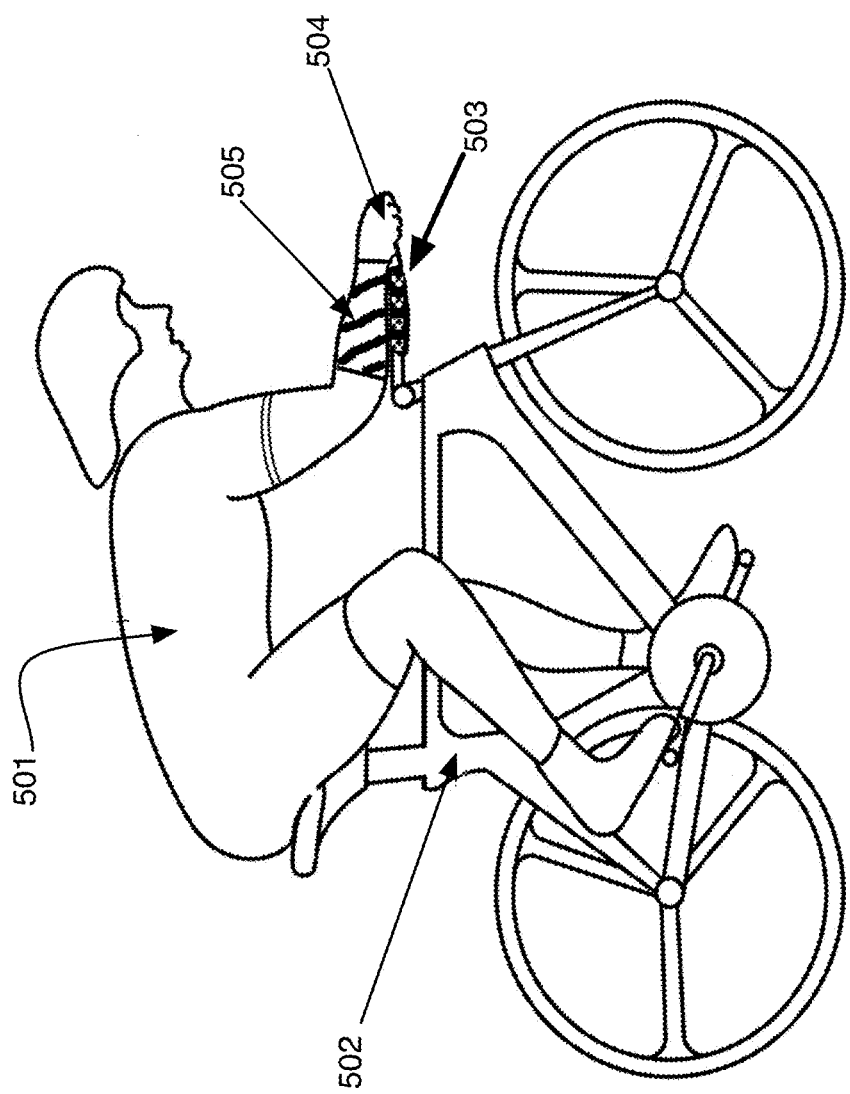
FIG. 5 shows a rider in position using a wing-shaped handlebar system and wearing a support on his arm.

A further embodiment of the invention is shown in FIG. 5. The rider 501 is shown in an aerodynamic position on the bicycle 502 that includes the wing shaped handlebars 503. The rider is fitted with a sleeve 505 over either one arm or both arms. The sleeve attaches to the winged handlebar by means that are shown in the subsequent drawings. Note that in the figure the rider's hands 504 are free. The rider's hands are not holding onto to any part of the bicycle or handlebars. The bike is controlled and steered by the motion of the rider's arms through the sleeves attached to the handlebars.

Figure 6:
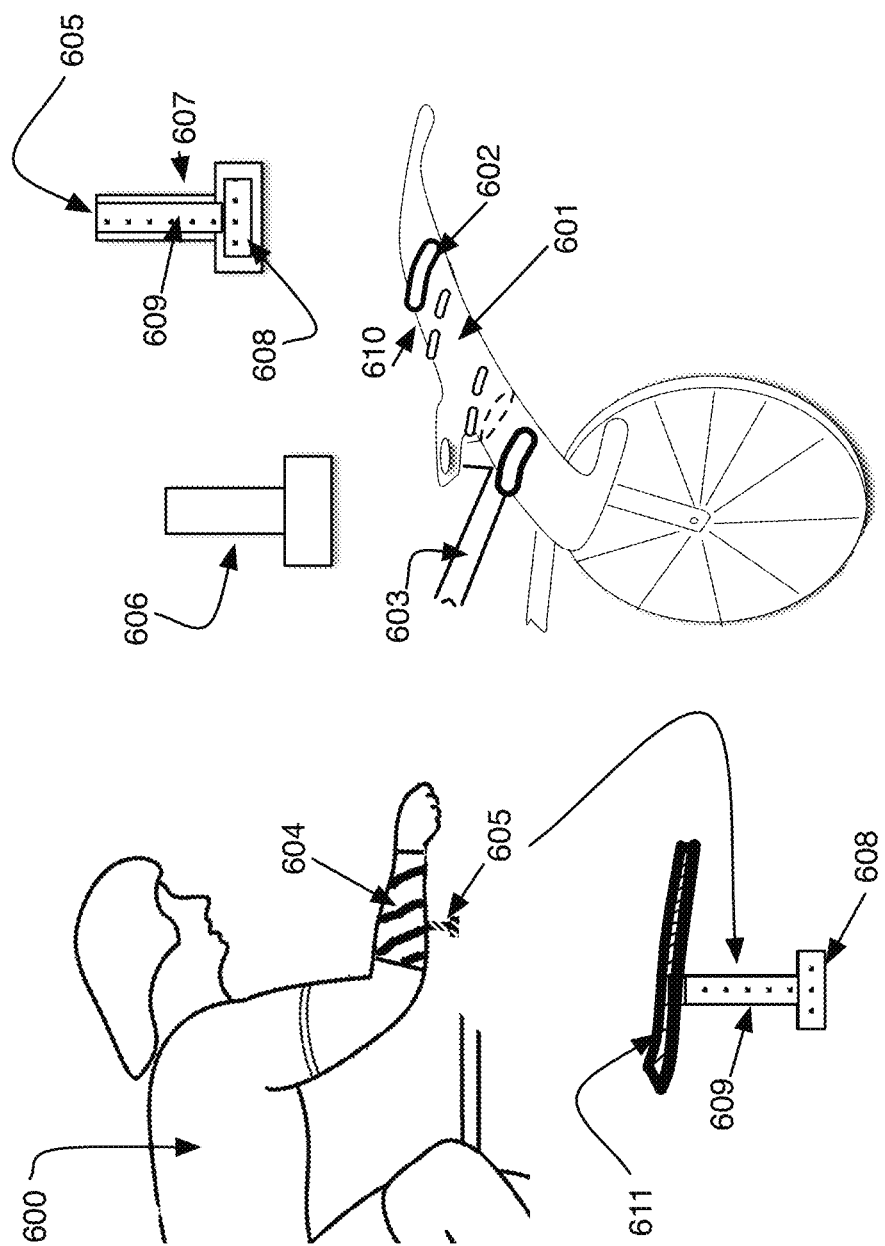
FIG. 6 shows details of the support to be worn on the rider's arm(s) and attachment means to the wing-shaped handlebar system.

A closer view of the sleeve and the attachment mechanism is seen in FIG. 6. The sleeve 604 is comprised of a cylinder that fits over the forearm of the rider 600. The sleeve may be composed of plastic or cloth or a combination of plastic and cloth. In one embodiment the sleeve includes a t-shaped projection 605. The projection is comprised of a vertical cylinder 609 that is attached to the sleeve 604 and a horizontal top 608 of the "T". In one embodiment the projection includes a platform 611. The platform is shaped to fit the underside of the forearm of a rider. The platform is rigid typically made of plastic material and fits within the sleeve 604 to secure the rider forearm to the platform and thereby secure the rider forearm to the projection 605. The projection is sized to fit within a slot 602 on the handlebar 601 that is attached to the bicycle 603. The slot is t-shaped as shown in view 606 and the projection 605 fits within the slot 606 as shown in the view 607. The rider inserts the projection into the slot from the rear 610 of the handlebar 601 to secure their forearm to the handlebar while riding. Note that once secured through the projection on the sleeve, the rider's hand(s) is not attached or holding the handlebar.

Figure 7:
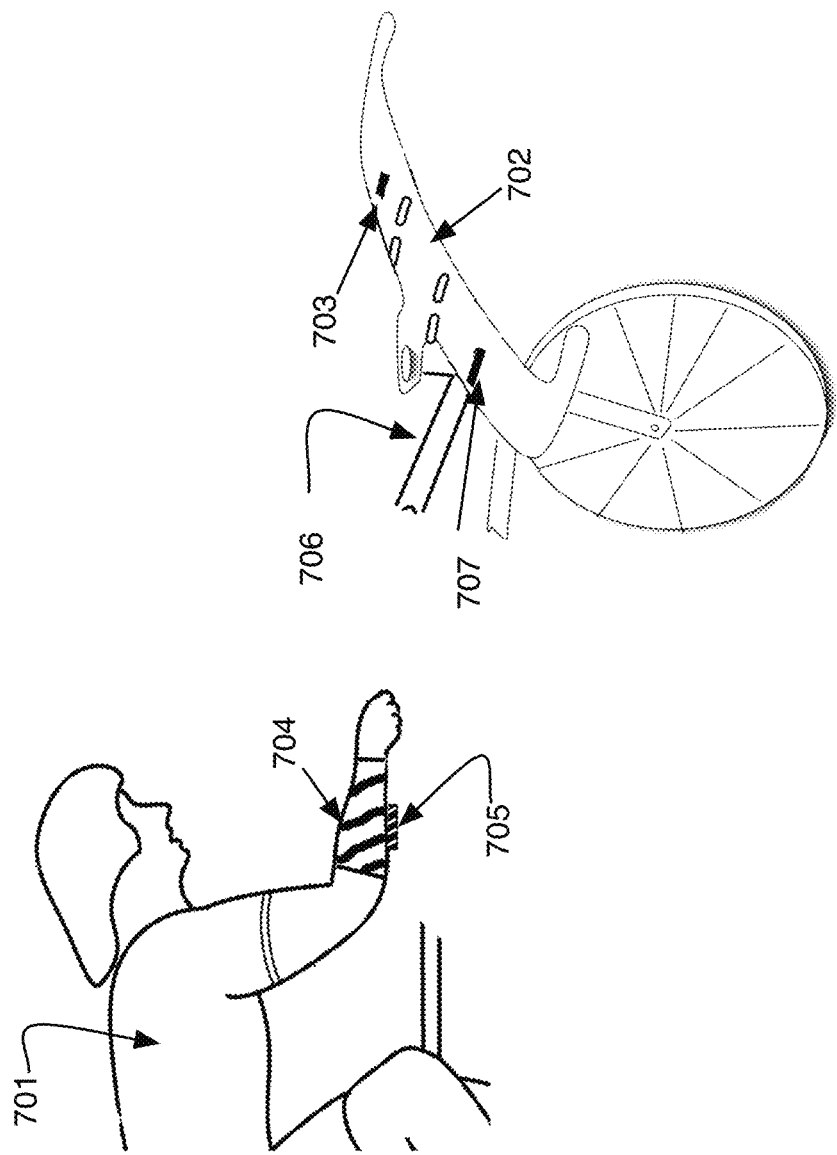
FIG. 7 shows a second embodiment of attachment means for the support.

In another embodiment, shown in FIG. 7, the rider 701 is wearing a sleeve 704 on their forearm. The rider may where a sleeve on one or both forearms. The bottom of the sleeve 704 includes a means 705 to attach to attachment point 703, 707 on the handlebar 702 attached to the bicycle 706. In a preferred embodiment the sleeve is made of cloth with a plastic insert to support the riders forearm. The insert (not shown) is shaped to comfortably fit the forearm of the rider. The attachment means 705 is a hook and latch material that will mate with hook and latch material forming the attachment points 703, 707 on the handlebar 702.

Figure 8:
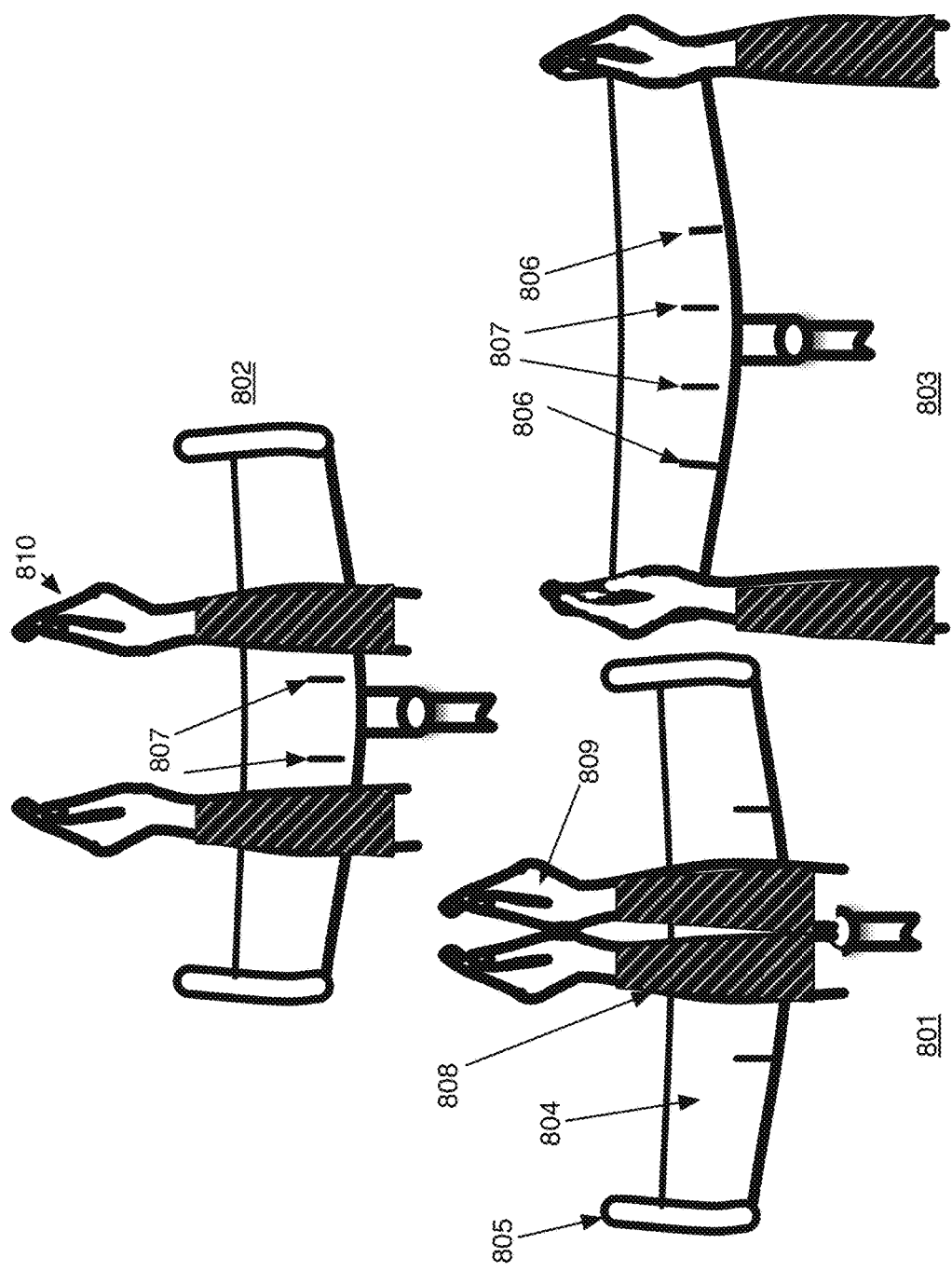
FIG. 8 shows multiple positions that can be assumed by a rider in using the invention.

Referring now to FIG. 8, the handlebar assembly system 804 may include a plurality of attachment points. In a first view 801 the rider is wearing a sleeve 808 and the sleeve is attached to an innermost set of attachment points 807. This would place the arms of the rider closer together and form a most aerodynamic position for riding albeit at the sacrificed of stability. The rider's hands 809 are positioned closest to one another in this position and may be joined or otherwise held together for comfort and aerodynamics. A second more stable, less aerodynamic position is shown in a second view 802. The rider is wearing a forearm sleeve that is attached to a second set of connection points 806. The handlebars further afford a third riding position shown in the view 803 where the rider grips the handles 805 at the outermost edge of the handlebars. This position would be the most stable for riding and would likely be used for cornering or where road conditions require more secure control of the bicycle. Note that in the two aerodynamic positions shown in views 801, 802 the rider's hands are not touching the handlebars or any other part of the bicycle. Either a control system for braking and shifting of the derailleur would be required or the rider would need to shift to the position shown in the third view 803 to access brake and shifting controls. A new control system to be used with the handlebar system is shown in FIGS. 9-12.

Figure 9:
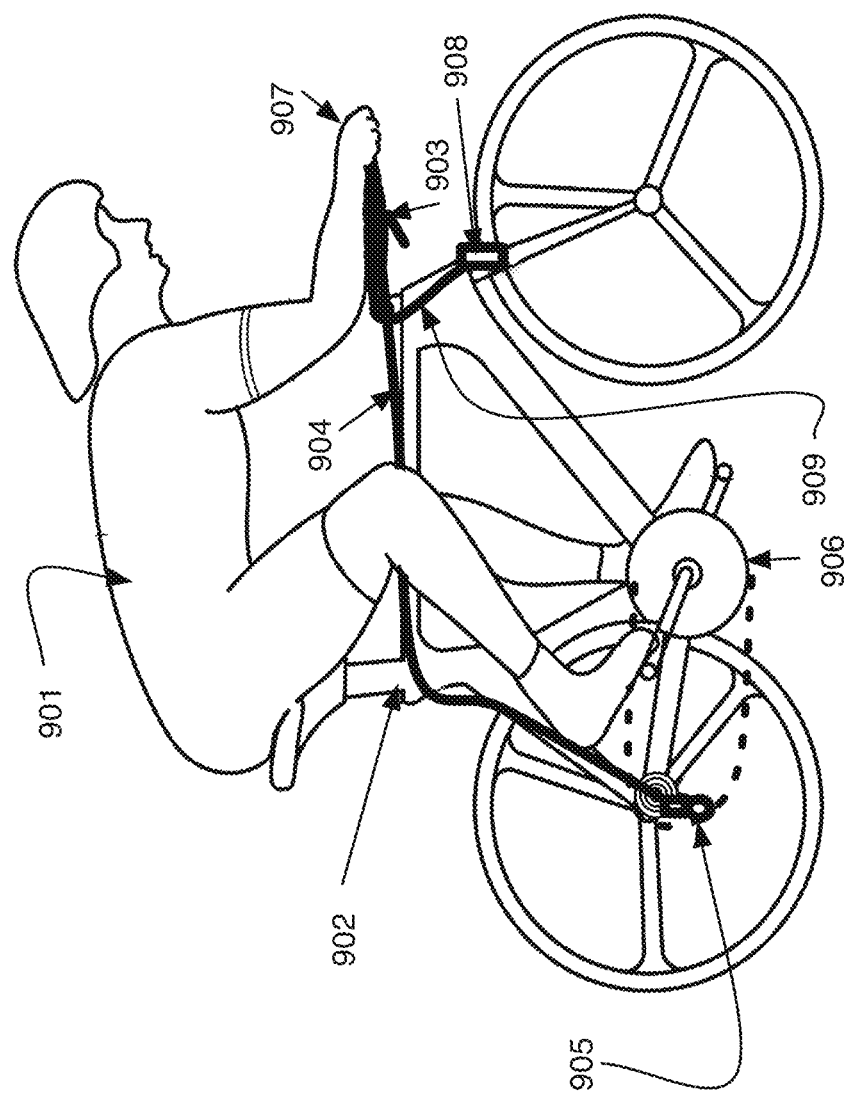
FIG. 9 shows elements of a control systems to be used with the handlebar system.

Referring to FIG. 9, a prior art control system for brakes and derailleur is shown. A rider 901 on the bicycle 902 has access to handbrakes through a lever 903 on the handlebars and to a shift lever (covered by the riders hands) 907. The shift lever is connected by either a wire or cable 904 to a derailleur 905. Actuating the shift lever will change the bicycle gearing through actuation of the derailleur 905. A second derailleur not shown may be located near the front crank 906 and is actuated similarly. Both fully mechanically actuated and electronically actuated derailleurs are known in the art. The connection to an electronically actuated derailleur would be a wire or wire pair and the connection to a fully mechanical derailleur would be through a twisted wire cable in a housing. In the former case the lever acts as either a multi-position switch or a toggle switch. In the latter case moving the lever changes tension on the cable to move the derailleur arm. Similarly, a cable 909 is run from the brake lever 903 to the brakes 908. Both hydraulic and mechanical brakes are known in the art. The cable for hydraulic brakes would be either a stranded wire cable in a housing that actuates a cylinder containing hydraulic fluid and thereby provided a pressure to move a cylinder and actuate brakes or in some cases the cylinder is incorporated into the brake lever 903 and the cable is a tube filled with fluid to transmit the pressure to a second cylinder at the brake location and actuate the brakes. The cable for mechanical, non-hydraulic brakes would be a stranded wire cable within a housing. The rider must move their hands to the brake lever to actuate the brakes.

Figure 10:
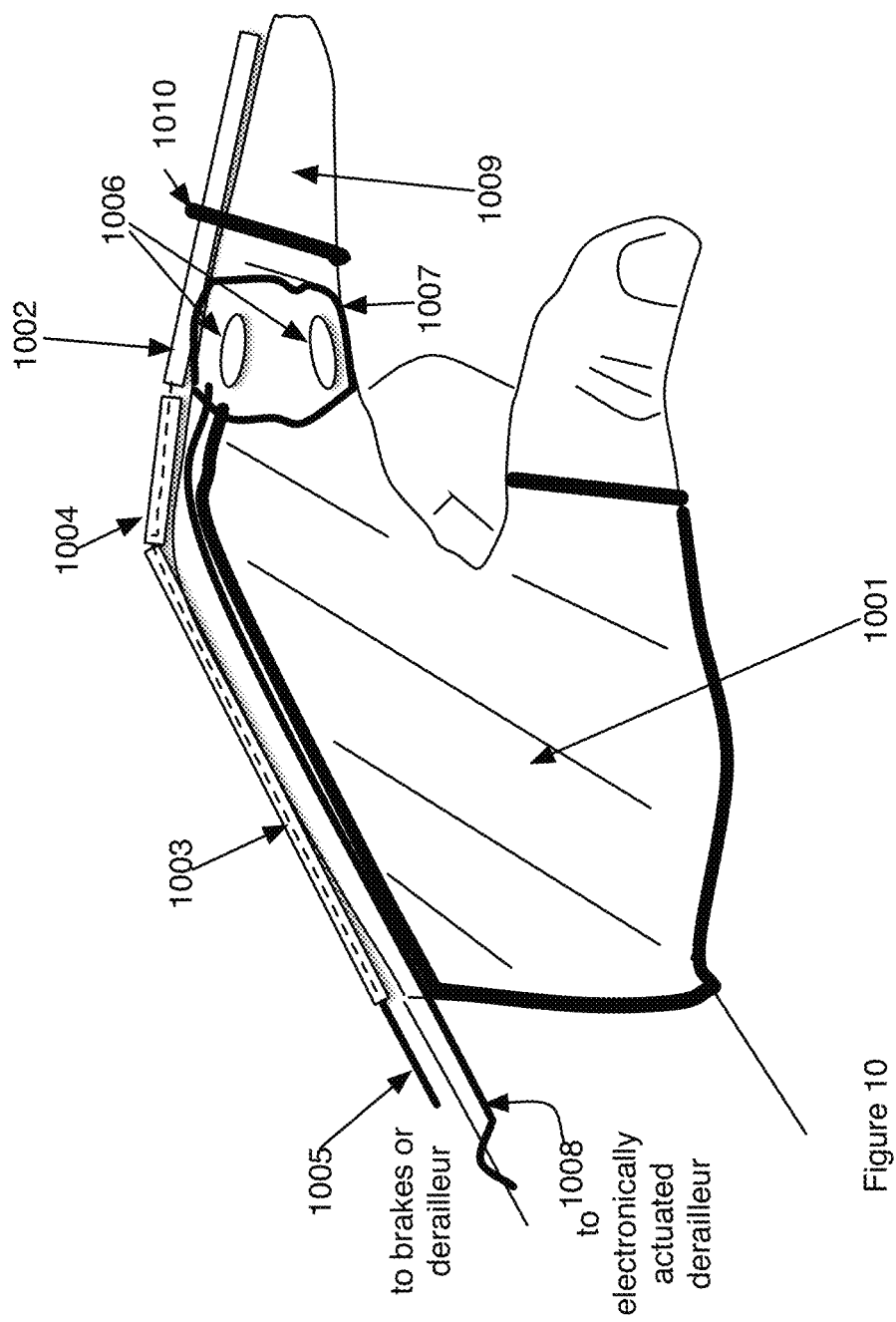
FIG. 10 shows a close view of a rider's hand that is using the control systems.

An embodiment of a control system compatible with the handlebars shown in FIGS. 2-8 is shown in FIG. 10. The control system is attached to a glove 1001 to be worn on the rider's hand. Controls for both brakes and derailleurs are incorporated into the glove such that the rider can actuate the brakes and shift gears without moving their hands from the aerodynamic position. A first actuator is a cable actuator comprised of segmented sections of 1003, 1004 with a twisted wire cable or other suitable cable material 1005 running through the inside of the housing. The end of the cable is attached to an actuator lever 1002 that is in turn attached 1010 to the rider's finger 1009. When the rider bends their finger (see FIG. 11) the actuator lever pulls on the cable and actuates the brakes or derailleur attached to the end of the cable (not shown). The cable actuator may be used to activate any device that is activated by a pull or varying tension on a cable.

A second electronic actuator is also included. The actuator is comprised of at least one switch 1006. In the example shown two button switches are shown. The switches are attached to a base 1007 and a wire 1008 runs from the switches to a device to be actuated electronically. In the preferred embodiment shown the two switches 1006 correspond to shifting the electronic derailleur of the bicycle up and down. The wire 1008 is a multiple conductor wire. The number of conductors is dependent upon the number of switches 1006.

Figure 11:
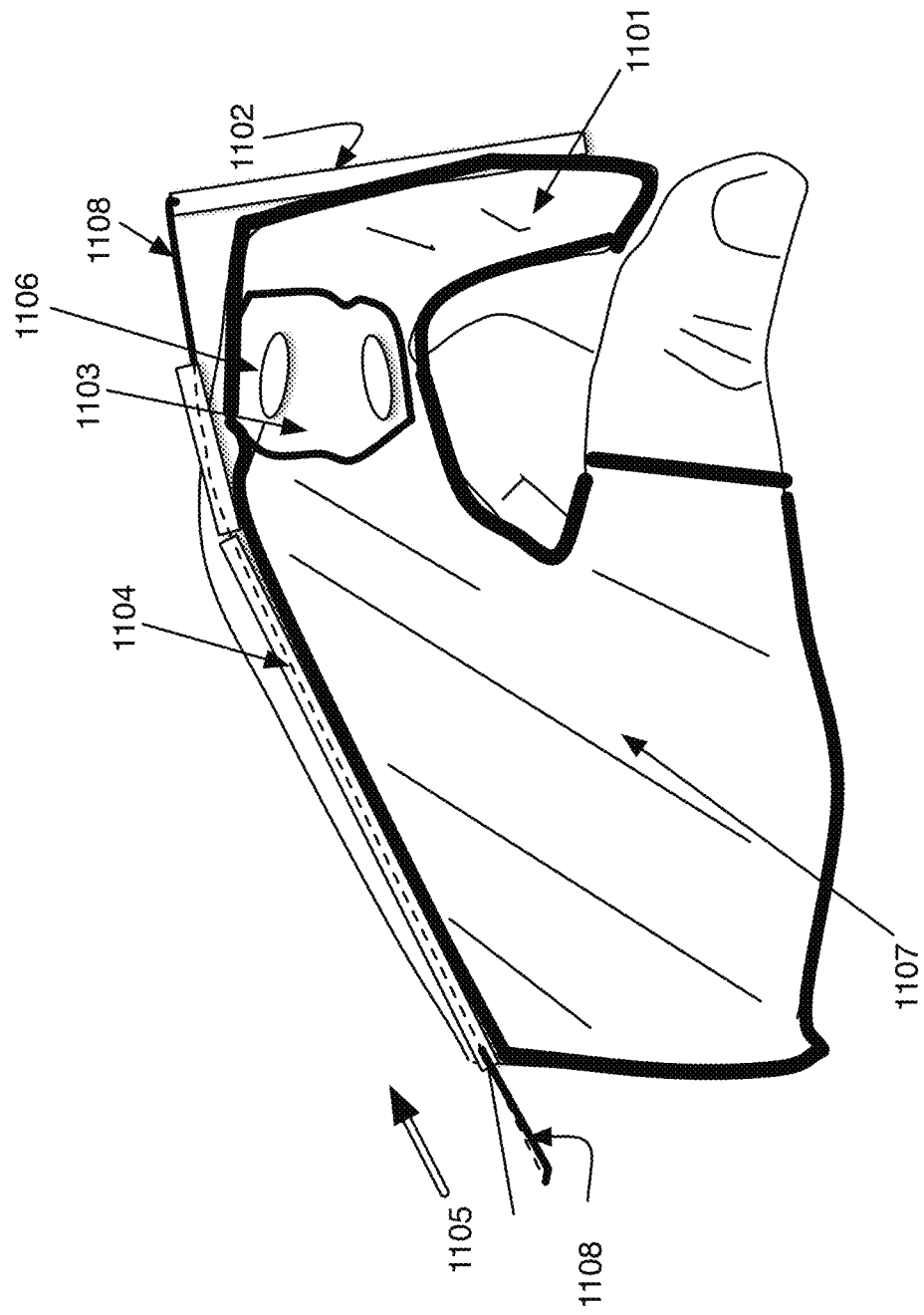
FIG. 11 shows a view of the rider's hand where a cable controller is actuated.

Referring now to FIG. 11 the controller system is shown where the cable actuator is actuated by the rider bending the finger 1101. In the embodiment shown, the actuator lever 1102 and the switch controller 1103 are attached to a glove 1107. In this manner the rider need only don the glove to be ready to control both brakes and derailleur. Although a single set of actuators are shown in FIGS. 10 and 11, in practice actuators may be incorporated in gloves or attached to both hands of the rider. In this manner the typical control of both front and rear derailleur as well as front and rear brakes can be actuated by actuators on the rider's left and right hands. In another embodiment, not shown, multiple cable and switch actuators may be incorporated in a single glove such that both front and rear derailleurs as well as front and rear breaks may be controlled from a single hand. The cable actuator is comprised as already described of a cable 1108 that is routed through a housing 1104 and is attached to a lever 1102 such that when the rider bends their finger 1101 the lever 1102 pulls on the cable resulting in tension and movement in the direction 1105. The system further includes the electronic switches 1106 attached to a base 1103 that is in turn wired with multiple conductor wires to electronically actuated devices, such as an electronic derailleur or electronically actuated brakes as are known in the art. In another embodiment the switch base further includes a wireless communication module thereby obviating the need for the multiple conductor wire.

Figure 12A:
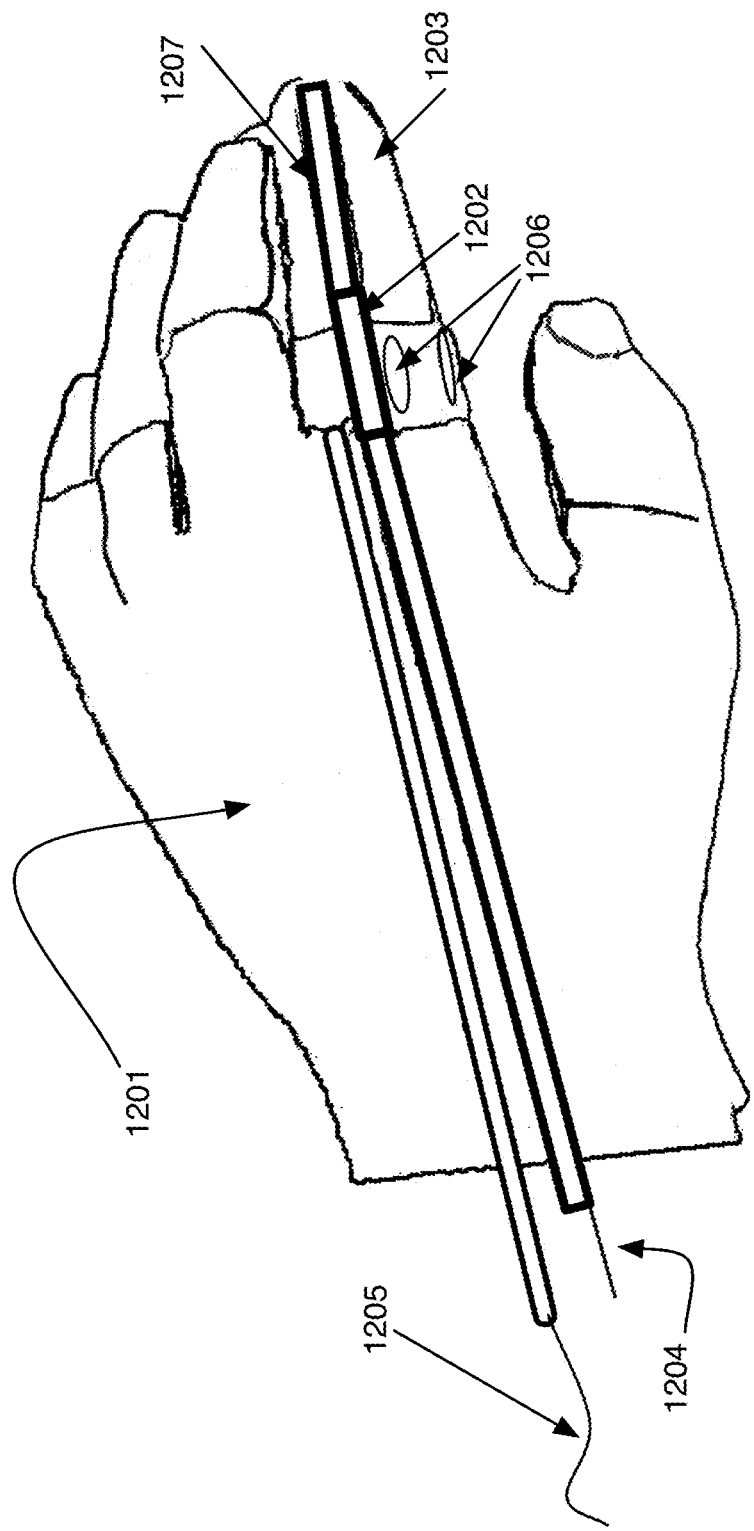
FIG. 12A shows an embodiment of the control systems incorporated into a glove worn by a rider.
Figure 12:
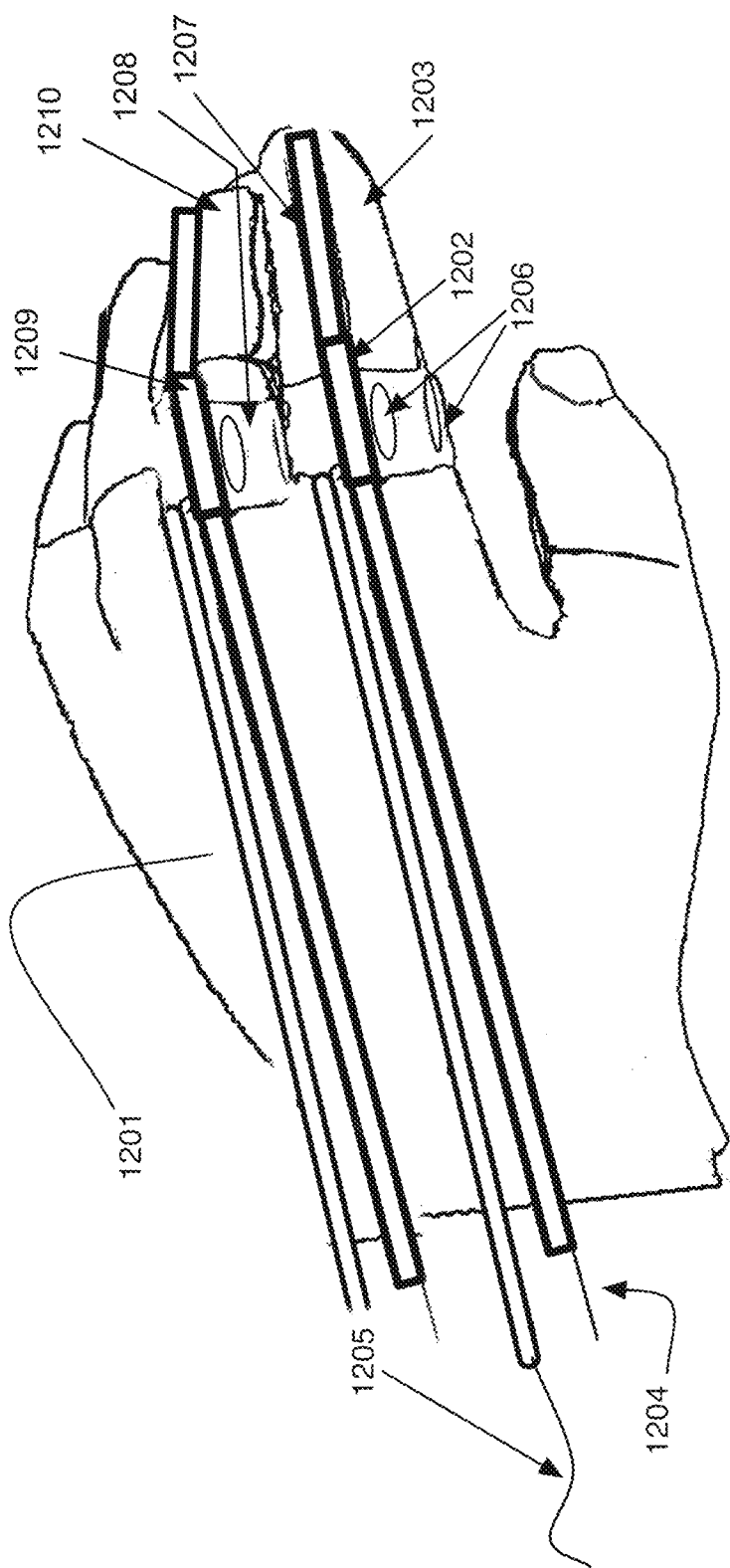
FIG. 12B shows an embodiment of the control system with a plurality of actuators.

FIG. 12A shows an embodiment incorporating 4 actuators into a glove on a single (left) hand. The two actuators are incorporated into a glove 1201 the first actuator is a mechanical cable actuator 1202 as already described actuated by the index finger 1203 such that when the index finger is bent at the second knuckle the lever 1207 is actuated to pull on the cable 1204. Also attached to the index finger is an electronic switch actuator with switches 1206 in electronic communication, in the case shown by wires 1205 with an electronic device to be controlled by the rider. In the embodiment shown a second actuator pair 1208, 1209 are attached to the middle finger. The cable actuator 1209 is actuated by the rider bending the middle finger at the second knuckle and the switch actuator 1208 may be actuated by the thumb pressing the switches. Note the cable actuators on both fingers are actuated by bending at the second knuckle. Neither is actuated by bending at the first knuckle such that the rider may bend at the first knuckle to provide access of the thumb to the electronic switch on the middle finger.

Referring now to FIG. 12B, another embodiment includes a plurality of actuators worn on a glove 1201 on a rider's hand. A first actuator system is as already described in FIG.

12A comprising parts 1202, 1204, 1205, 1206, 1207 attached a first finger of the glove 1203 on the rider's hand. A second actuator 1208, 1209 comprised of equivalent parts to that of the first actuator are attached to a second finger 1210 of the glove on the rider's hand. In one embodiment the first actuator use the cable 1204 to control a first braking system of the bike and the electronic connection 1205 is attached to a first electric derailleur actuator on the bicycle. The second actuator is attached to a second brake cable on the bicycle and the second electric connection is attached to a second derailleur on the bicycle. The rider may thereby control both a front and rear braking system using the cable actuators and front and rear derailleurs using the electric actuators.

In another embodiment the wing-shaped handlebars are combined with the actuators and the sleeves worn by the rider that attach to the handlebars to provide a handlebar and control system that provide a unique new system for an aerodynamic position of the rider. The handlebars are the basis of the system and in this embodiment require a means to attach the rider arms to the handlebars for stability and control of the bike direction. The embodiment inherently leaves the rider's hands free in space in front of the handlebars and there is a need for the rider to be able to control the brakes and derailleur while so positioned. The actuator system provides this means.

SUMMARY

The present invention has been described in terms of the preferred embodiment and it is recognized that equivalents, alternatives and modifications, beyond those expressly stated, are possible and are within the scope of the attached claims.

A bicycle handlebar system is described. The system includes a wing-shaped handlebar for a bicycle that is attached to at least one of the rider's forearms. A sleeve, worn by the rider is included in some embodiments. The system also includes a remote control system incorporated into the rider's glove to control the derailleur and brakes of the bicycle without the need for the rider to move his hands to a new position. Multiple positions of the rider's forearms are possible for varying degrees of aerodynamic performance and control of the bicycle.

What is claimed is:

1. A handlebar for a bicycle comprising:
    a. a platform having a first edge and a second edge located on an outer perimeter and parallel to each other and perpendicular to the travel direction of the bicycle, a third edge and a fourth edge located on the outer perimeter and parallel to each other and parallel to the travel direction of the bicycle, and a top surface, and including an attachment point to the bicycle located along the first edge and midway between the third edge and the fourth edge,
    b. two hinges within the platform, said hinges located parallel to the third and fourth edges, and on either side of the attachment point, thereby allowing the third edge and the fourth edge to be raised and lowered, and
    c. a first attachment zone located on the top surface of the platform and between the attachment point to the bicycle and either the third edge or the fourth edge, said first attachment zone sized and shaped to connect with a second attachment zone worn by the rider of the bicycle and attached to a forearm of the rider, thereby removably attaching the rider's forearm to the handlebar by mating the first attachment zone on the platform with the second attachment zone on the rider's forearm, and
    d. wherein the first attachment zone is an adhesive material.

2. A sleeve to be worn by a rider using a handlebar according to claim 1, said sleeve comprising:
    a. a tube-shaped fabric covering to be worn over the rider's forearm, the tube-shaped fabric covering having a top surface and a bottom surface,
    b. the second attachment zone on the bottom surface of the tube-shaped fabric.

3. A control system for a bicycle rider using a handlebar according to claim 1, said control system comprising a cable housing attached to the top of the rider's hand through which is threaded an actuator cable, the actuator cable sized to slide within the cable housing, a lever attached to a forefinger on the rider's hand and said actuator cable attached to a first end of the lever such that when the rider flexes the forefinger to which the lever is attached the cable is pulled and thereby actuated, and
    where the attachment to the rider's hand is through means of a glove worn by the rider and the cable housing and lever are attached to the glove.

4. The control system of claim 3, comprising a plurality of the cable housings and a plurality of the levers, each including one of a plurality of the actuator cables, and, each attached to separate fingers on the glove worn by the rider thereby allowing independent control of a plurality of devices on the bicycle, the plurality of devices actuated separately by one of the plurality of actuator cables.

5. A handlebar for a bicycle comprising:
    a. a platform having a first edge and a second edge located on an outer perimeter and parallel to each other and perpendicular to the travel direction of the bicycle, a third edge and a fourth edge located on the outer perimeter and parallel to each other and parallel to the travel direction of the bicycle, and a top surface, and including an attachment point to the bicycle located along the first edge and midway between the third edge and the fourth edge,
    b. two hinges within the platform, said hinges located parallel to the third and fourth edges, and on either side of the attachment point, thereby allowing the third edge and the fourth edge to be raised and lowered, and
    c. a first attachment zone located on the top surface of the platform and between the attachment point to the bicycle and either the third edge or the fourth edge, said first attachment zone sized and shaped to connect with a second attachment zone worn by the rider of the bicycle and attached to a forearm of the rider, thereby removably attaching the rider's forearm to the handlebar by mating the first attachment zone on the platform with the second attachment zone on the rider's forearm, and
    d. wherein the first attachment zone is a slot, said slot located parallel to the third edge and on the top surface of the platform and between the attachment point to the bicycle and either the third edge or the fourth edge, the slot sized and shaped to accept an attachment pin worn by the rider of the bicycle and attached to the forearm of the rider thereby removably attaching the rider's forearm to the handlebar by sliding the attachment pin into the slot.

6. A sleeve to be worn by a rider using a handlebar according to claim 5, said sleeve comprising:

a. a tube-shaped fabric covering to be worn over the rider's forearm the tube-shaped fabric covering having a top surface and a bottom surface,
b. the second attachment zone on the bottom surface of the tube-shaped fabric.

7. A control system for a bicycle rider using a handlebar according to claim 5, said control system comprising a cable housing attached to the top of the rider's hand through which is threaded an actuator cable, the actuator cable sized to slide within the cable housing, a lever attached to a forefinger on the rider's hand and said actuator cable attached to a first end of the lever such that when the rider flexes the forefinger to which the lever is attached the cable is pulled and thereby actuated, and where the attachment to the rider's hand is through means of a glove worn by the rider and the cable housing and lever are attached to the glove.

8. The control system of claim 7, comprising a plurality of cable housings and a plurality of lever each including one of a plurality of the actuator cables, and, each attached to separate fingers on the glove worn by the rider thereby allowing independent control of a plurality of devices on the bicycle, the plurality of devices actuated separately by one of the plurality of the actuator cables.

* * * * *